United States Patent [19]
Vartanian

[11] 3,730,154
[45] May 1, 1973

[54] ENGINE SPARK TIMING CONTROL
[75] Inventor: Richard D. Vartanian, Dearborn, Mich.
[73] Assignee: Ford Motor Company, Dearborn, Mich.
[22] Filed: Feb. 2, 1972
[21] Appl. No.: 222,886

[52] U.S. Cl............123/117 A, 123/97 B, 123/117 R
[51] Int. Cl...............................................F02p 5/06
[58] Field of Search.........................123/117 A, 97 B

[56] References Cited
UNITED STATES PATENTS

| | | | |
|---|---|---|---|
| 3,007,987 | 11/1961 | Barnes | 123/117 A |
| 3,491,735 | 1/1970 | Walker | 123/117 A |
| 3,638,626 | 2/1972 | Marshall | 123/117 A |
| 3,677,238 | 7/1972 | Harada | 123/117 A |
| 3,688,753 | 9/1972 | Walker | 123/117 A |
| 3,698,366 | 10/1972 | Gropp | 123/117 A |

*Primary Examiner*—Laurence M. Goodridge
*Assistant Examiner*—Cort Flint
*Attorney*—Keith L. Zerschling et al.

[57] ABSTRACT

The ignition timing includes a distributor having a vacuum controlled servo actuator to advance the timing as a function of changes in carburetor spark port vacuum, the servo normally spring biasing the distributor towards a minimum advanced or retarded timing position; the vacuum line from the spark port including a device that is operative (1) during light vehicle accelerations to delay the spark advance by delaying vacuum application to the servo, (2) during heavy accelerations to immediately retard the ignition timing by transferring the higher spark port pressure signal directly to the servo; (3) to provide an immediate retarded ignition timing during vehicle decelerations by directly communicating spark port pressure level to the servo; (4) to provide immediate return of the timing to an advance setting after momentary decelerations by again directly connecting the spark port pressure level to the servo; and, (5) to provide normal spark advance during cold weather operation by directly connecting the spark port vacuum to the servo; the above providing low emissions and good vehicle performance during all operating engine conditions.

14 Claims, 1 Drawing Figure

Patented May 1, 1973 3,730,154
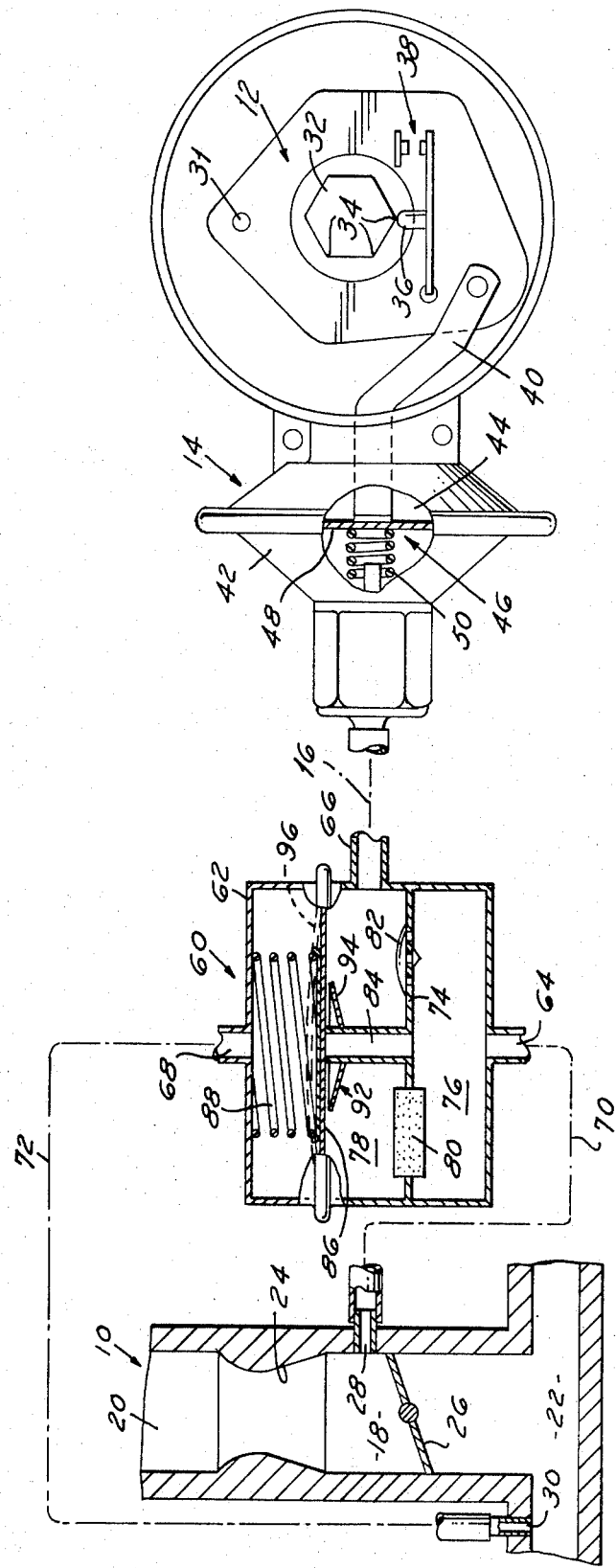

ENGINE SPARK TIMING CONTROL

This invention relates, in general, to an engine spark timing control system. More particularly, it relates to one providing a delayed spark advance during normal vehicle accelerations, with a quick spark timing recovery after momentary decelerations, and a bypass of the spark timing control to provide normal spark advance for cold weather performance operation.

This invention is an improvement upon the spark timing control devices shown in U.S. Ser. No. 59,500, Engine Spark Timing System, Richard D. Vartanian, filed July 30, 1970, now U.S. Pat. No. 3,678,907, and U.S. Ser. No. 60,489, Engine Spark Timing Control System, Karl H. Gropp, filed Aug. 3, 1970, now U.S. Pat. No. 3,698,366, all having a common assignee. The device shown in Ser. No. 59,500 delays spark advance during normal light vehicle accelerations while providing immediate maximum retarded timing during heavy vehicle accelerations; and, it has a vacuum reservoir that provides a quick recovery from a retarded setting back to a normal spark advance setting, after momentary vehicle decelerations, to improve emission as well as performance levels.

The device shown in Ser. No. 60,489 controls the engine spark timing by delaying the advance during normal light vehicle accelerations, and also delays movement of the timing toward a retarded setting during vehicle decelerations; it further quickly retards the timing during heavy vehicle decelerations; and, provides a quick recovery of the timing to a normal advanced setting after momentary decelerations.

The invention provides the advantages of the two above described devices, and in addition provides a control of the engine spark timing for cold weather operation to provide better emission and performance operation. More particularly, the invention consists of a device located between the carburetor spark port and distributor servo that not only slowly advances the spark timing during normal light vehicle accelerations, quickly moves the timing into a maximum retarded setting during heavy vehicle accelerations, and provides a quick recovery of the timing to an advanced setting after momentary decelerations; but also provides good cold weather operation by providing normal spark advance below a predetermined temperature level by rendering ineffective the other controls at this time.

It is an object of the invention, therefore, to provide an engine spark timing control that combines all of the features described above into a single device located between the carburetor and the engine distributor servo actuator to reduce emission output while at the same time provide good performance during all engine operating conditions.

It is another object of the invention to provide an engine spark timing control system that includes a device located between the engine carburetor and distributor that (1) automatically slowly advances the engine spark timing during normal light vehicle accelerations; (2) quickly retards the engine timing during engine decelerations and heavy engine accelerations; (3) quickly returns the spark timing towards a normal advanced setting subsequent to momentary vehicle decelerations; and, (4) provides a normal spark advance of the timing for cold weather operation below a predetermined temperature by rendering the spark delay and other portions of the device ineffective.

Other objects, features and advantages of the invention will become more apparent upon reference to the succeeding detailed description thereof, and to the drawing wherein the figure illustrates schematically a cross sectional view of an engine ignition timing control system embodying the invention.

The figure shows, schematically, only those portions of an internal combustion engine that are normally associated with the engine distributor spark timing setting control; such as, for example, a carburetor 10, a distributor breaker plate 12, a vacuum servo 14 to control the movement of breaker plate 12, and a line 16 connected between the carburetor and vacuum servo to automatically change the engine spark timing setting as a function of changes in engine spark port vacuum.

More specifically, carburetor 10 is shown as being of the downdraft type having the usual air-fuel induction passage 18 with an atmospheric air inlet 20 at one end and connected to the engine intake manifold 22 at the opposite end. Passage 18 contains the usual fixed area venturi 24 and throttle valve 26. The latter is rotatably mounted on a part of the carburetor body across passage 18 in a manner to control the flow of air-fuel mixture into the intake manifold. Fuel would be inducted in the usual manner from a nozzle, not shown, projecting into or adjacent venturi 24, in a known manner.

Throttle valve 26 is shown in its engine idle speed position essentially closing induction passage 18, and is rotatable to a nearly vertical position essentially unblocking passage 18. A spark port 28 is provided at a point just above the idle position of throttle valve 26, to be transversed by the throttle valve during its part throttle opening movements. This will change the vacuum level in spark port 28 as a function of the rotative position of the throttle valve, the spark port reflecting essentially atmospheric pressure in the air inlet 20 upon closure of the throttle valve. An intake manifold vacuum sensing port 30 is also provided, for a purpose to be described.

As stated previously, the distributor includes a breaker plate 12 that is pivotally mounted at 31 on a stationary portion of the distributor, and movable with respect to cam 32. The latter has six peaks 34 corresponding to the number of engine cylinders. Each of the peaks cooperates with the follower 36 of a breaker point set 38 to make or break the spark connection in a known manner for each one-sixth, in this case, rotation of cam 32. Pivotal movement of breaker plate 12 in a counter-clockwise spark retard setting direction, or in a clockwise spark advance setting, is provided by an actuator 40 slidably extending from vacuum servo 14.

Servo 14 may be of a conventional construction. It has a hollow housing 42 whose interior is divided by an annular flexible diaphragm 48 into an atmospheric pressure chamber 44 and a vacuum chamber 46. The diaphragm is fixedly secured to actuator 40, and is biased in a rightward retard direction by a compression spring 50. Chamber 44 has an atmospheric or ambient pressure vent, not shown, while chamber 46 is connected by a bore, not shown, to line 16.

During engine-off and other operating conditions to be described, atmospheric pressure exists on both sides of the diaphragm 48, permitting spring 50 to force the actuator 40 to the lowest advance or a retarded setting position. Application of vacuum to chamber 46 moves diaphragm 48 and actuator 40 toward the left to an engine spark timing advance position, by degrees as a function of the change in vacuum level.

Turning now to the invention, the vacuum line between the spark port 28 and line 16 of the servo contains a control device 60 having a hollow casing 62. The casing has three outlets 64, 66 and 68, outlet 64 being connected by a line 70 to spark port 28; outlet 66 being connected to line 16, and outlet 68 being connected by a line 72 to the manifold vacuum port 30.

Housing 60 contains a first rigid partition member 74 dividing the casing into two chambers 76 and 78 and separating the two lines 70 and 16. The partition 74 contains a number of openings permitting controlled communication between the chambers 76 and 78. The openings include a sintered metal orifice 80, a one-way umbrella type check valve 82 and an unrestricted passage 84. The sintered metal orifice 80 permits only slow communication of the pressure levels between chambers 76 and 78, and as will be seen later, permits only a slow or delayed spark advance with increases in the vacuum in spark port 28. The one-way check valve 82 is of a conventional construction and is unseated when the pressure level in chamber 76 exceeds that in chamber 78 to quickly communicate the pressure levels between lines 64 and 66, bypassing the sintered metal orifice 80. The unrestricted line 84 is a further bypass between chambers 76 and 78 to at times permit free communication of pressure levels between chambers 76 and 78, as will be described.

The wall of chamber 78 remote from the partition 74 is defined by an annular flexible diaphragm 86 that is biased by a spring 88 to the position shown seated against the open end of passage 84 to block it. The diaphragm thus in effect is a valve seating and unseating against the open end of the conduit 84 to permit or block free communication of the pressure levels between chambers 76 and 78. The force of spring 88 is chosen so that it will maintain the diaphragm in the position shown blocking line 84 in all operative conditions of the engine except during decelerating operations when the manifold vacuum level in line 72 reaches a high value, such as, for example, over 21 inches Hg.

Completing the construction, a bimetallic temperature responsive element 92 is secured in the device 60 adjacent the passage 84 and the diaphragm 86. The characteristics of the bimetal 92 are such that its outwardly projecting arms 94 are in the position shown below a predetermined ambient temperature level so as not to interfere with the operation of the device above this predetermined temperature. However, below the temperature, for cold weather operation, the arms 94 will move upwardly in response to temperature decreases until the desired temperature level is reached, at which point the arms will move the diaphragm 86 upwardly to the dotted line position 96 off the end of the conduit 84 to immediately provide direct communication between chambers 76 and 78.

Thus, at this time, the spark timing will be advanced as a direct function of the level of vacuum in the spark port 28 regardless of the effect of the sintered metal orifice 80, the check valve 82, or the vacuum in the manifold 22. In other words, for cold weather performance operation, the bimetal 92 renders ineffective all of the other controls contained in device 60 and provides advance and retard of the spark timing as if the device 60 were not in the line 16 at all.

In operation, prior to starting the engine, servo chambers 44 and 46 are equalized at atmospheric or ambient pressures, and, therefore, the spark timing is conditioned for a maximum retarded setting, for starting purposes.

When the engine is started and begins running, the closed throttle position shown provides essentially an atmospheric pressure level in spark port 28, and, therefore, the spark timing remains retarded. Upon opening the throttle valve for providing light normal vehicle accelerations, the manifold vacuum level reflected in spark port 28 and chamber 76 is communicated slowly to chamber 78 and servo line 16 through the sintered metal orifice 80. The check valve 82 is seated because of the higher pressure level in chamber 78. The line 84 remains closed since the force of spring 88 is overcome only during vehicle deceleration operation providing the high vacuum level necessary to overcome the spring force. Accordingly, the servo diaphragm 48 is slowly moved leftwardly to slowly advance the spark timing.

If now the throttle is suddenly moved wide open indicating heavy vehicle accelerations, and assuming some if not maximum spark advance has already been provided by this time, the sudden decay of vacuum at the spark port 28 reflected in chamber 76 provides a higher pressure level therein as compared to that in chamber 78 to thereby unseat check valve 82 and immediately reflect the pressure level at the spark port to servo vacuum chamber 46. This permits spring 50 to stroke the actuator 40 to the right to immediately move the spark timing breaker plate to retard the timing. The timing will then advance from the retarded setting as a function of the subsequent increase in manifold vacuum in spark port 28 as the vehicle accelerates and the throttle valve 26 is slowly backed off towards its closed position.

Now if the throttle valve is suddenly returned to the position shown, the pressure level at the spark port will be essentially atmospheric. With the engine decelerating, however, the manifold vacuum level at port 30 and in chamber 90 will be quite high and sufficient to overcome the force of spring 88 and open the passageway 84. This provides immediate communication of atmospheric pressure in spark port 28 to servo chamber 46 and provides an immediate stroking of the breaker plate to a maximum retarded setting. This is desirable to reduce emissions by providing later burning and lower combustion temperatures and pressures.

If after a momentary deceleration, the vehicle is again accelerated by opening throttle valve 26, since it takes approximately five seconds for the vacuum in the manifold to decay to the level of the pressure at the spark port, the vacuum in chamber 90 will maintain diaphragm 86 unseated from conduit 84. Simultaneously, however, the vacuum at the spark port 28 is communicated through chamber 76 and line 84 to line 16 to immediately stroke the breaker plate to essentially the same advanced setting that it had prior to the deceleration. It will be seen, therefore, that reacceleration after a momentary deceleration provides a quick recovery of the advance setting due to the construction of the device 60.

Finally, when the temperature level drops below a predetermined value, the bimetal 92 will at this time have moved the diaphragm 86 upwardly to provide direct communication between chambers 76 and 78. Accordingly, so long as the temperature remains below the predetermined chosen level, advance and retard of the engine timing will be maintained solely as a function of the changes in spark port vacuum in spark port 28.

From the above, it will be seen that the invention provides in one device all of the engine spark timing controls desired to provide reduced emissions while at the same time provide performance. It will also be seen that the invention provides a device that only provides slow advance during normal light vehicle accelerations, quickly retards the spark timing during heavy vehicle accelerations and decelerations, and provides a quick recovery of the system toward a normally advance setting after momentary vehicle decelerations, but also provides good cold weather operation by rendering ineffective the above described controls and permitting spark advance and retard solely as a function of the changes in spark port vacuum and throttle valve position.

While the invention has been described and illustrated in its preferred embodiment, it will be clear to those skilled in the arts to which it pertains that many changes and modifications may be made thereto without departing from the scope of the invention. For example, it will be clear that while a single diaphragm distributor servo actuator 14 is shown, the invention is equally applicable to one using a dual diaphragm distributor servo actuator such as, for example, is fully shown and described in FIG. 2 of U.S. Pat. No. 3,599,614, Kittredge, Dual Diaphragm Distributor, where line 16 could be connected to the primary or advance chamber of the servo shown therein.

I claim:

1. An engine spark timing control system comprising, an engine carburetor having an induction passage containing a spark port located above the idle speed position of a throttle valve controlling flow through the passage and subject to the change in vacuum in the induction passage as a function of the movement of the throttle valve from its idle speed position, an engine distributor having a breaker plate spring biased to a retarded spark timing position and being pivotally movable in opposite directions to advance and retard the spark timing, vacuum controlled servo means connected to the breaker plate for moving the same to advance the timing as a function of vacuum applied to the servo means, conduit means connecting the spark port and servo means, and flow rate control means in the conduit means to control the rate of change of application of vacuum from the spark port to the servo means, said control means including first flow rate delay means operable in response to a gradual opening of the throttle valve for light engine accelerating operation to slowly apply vacuum to the servo means to move the breaker plate in the advance spark direction at a slower rate than would normally be effected for the vacuum signal present at the spark port, and second means operable in response to closing of the throttle valve effecting a decelerating operation to immediately equalize the pressure levels at the spark port and servo means to immediately lower the spark timing towards a retarded setting, the second means being effective at times in response to a reaccelerating operation from the decelerating operation to render ineffective the first delay means and immediately equalize the spark port and servo means vacuum levels to restore the spark timing to a higher advance setting.

2. A spark timing control as in claim 1, the second means being operable by engine intake manifold vacuum above a predetermined level.

3. A spark timing control as in claim 1, including temperature responsive means to render both first and second means ineffective at times to permit advance and retard of the spark timing setting solely as a function of the change in throttle valve movement and spark port vacuum.

4. A spark timing control as in claim 1, the second means including an additional flow connection in the conduit means between the spark port and servo means bypassing the first means.

5. A spark timing control as in claim 1, the first means comprising a flow restriction and a one-way check valve in parallel flow paths between the spark port and servo means, the check valve unseating in response to a higher pressure level at the spark port than at the servo means.

6. A spark timing control as in claim 5, the second means including a further flow connection in the conduit means between the spark port and servo means in a parallel flow relationship to the flow restriction and the check valve.

7. A spark timing control as in claim 4, including valve means movable to block and unblock the additional flow connection.

8. A spark timing control as in claim 6, including valve means movable to block and unblock the further flow connection.

9. A spark timing control as in claim 8, including manifold vacuum means to move the valve means to an unblocking position, and spring means biasing the valve means to a blocking position.

10. A spark timing control as in claim 8, the second means including a second servo having an actuator spring biased to block the further flow connection and movable by manifold vacuum applied thereto to unblock the further flow connection.

11. A spark timing control as in claim 9, including temperature responsive means moving the valve means to an unblocking position below a predetermined temperature to render the flow restriction and check valve ineffective.

12. A spark timing control as in claim 1, the control means including a device located in the conduit means and having a hollow housing having first and second and third outlets connected respectively to the spark port and servo means and to manifold vacuum, the housing having partition means dividing the housing into a first chamber connected to the spark port first outlet, and a second chamber connected to the servo means second outlet, the partition means containing a number of passages including a flow restriction constituting the delay means and a one-way check valve and another passage forming a part of the second means for communicating flow between the chambers, and an annular flexible diaphragm defining a wall of the second chamber and a third chamber connected to the manifold vacuum outlet, and spring means biasing the diaphragm to seat against the another passage to normally block the same, manifold vacuum above a predetermined level in the third chamber moving the diaphragm to unblock the another passage and directly connect the port pressure level to the servo means.

13. A spark timing control system as in claim 12, including temperature sensitive means movable against the diaphragm below a predetermined temperature to unblock the another passage.

14. An engine spark timing control system comprising, an engine carburetor having an induction passage containing a spark port located above the idle speed position of a throttle valve controlling flow through the passage and subject to the change in vacuum in the induction passage as a function of the movement of the throttle valve from its idle speed position, an engine distributor having spark timing control means spring biased to a retarded spark timing position and being movable in opposite directions to advance and retard the spark timing, vacuum controlled servo means connected to the control means for moving the same to advance and retard the timing as a function of vacuum changes applied to the servo means, conduit means connecting the spark port and servo means, and flow rate delay means in the conduit means to slow the rate of change of application of vacuum from the spark port to the servo means, said delay means being operable in response to gradual changes in spark port vacuum level below a predetermined differential change upon change in position of the throttle valve to move the breaker plate in the advance spark direction at a rate slower than would normally be effected as called for by the vacuum signal present at the spark port, and temperature responsive means operable below and in response to the attainment of a predetermined temperature level to bypass the delay means to provide cold weather spark timing changes concurrent with and as a function of changes in spark port vacuum level and independent of the flow rate delay means.

* * * * *